Figure 1:
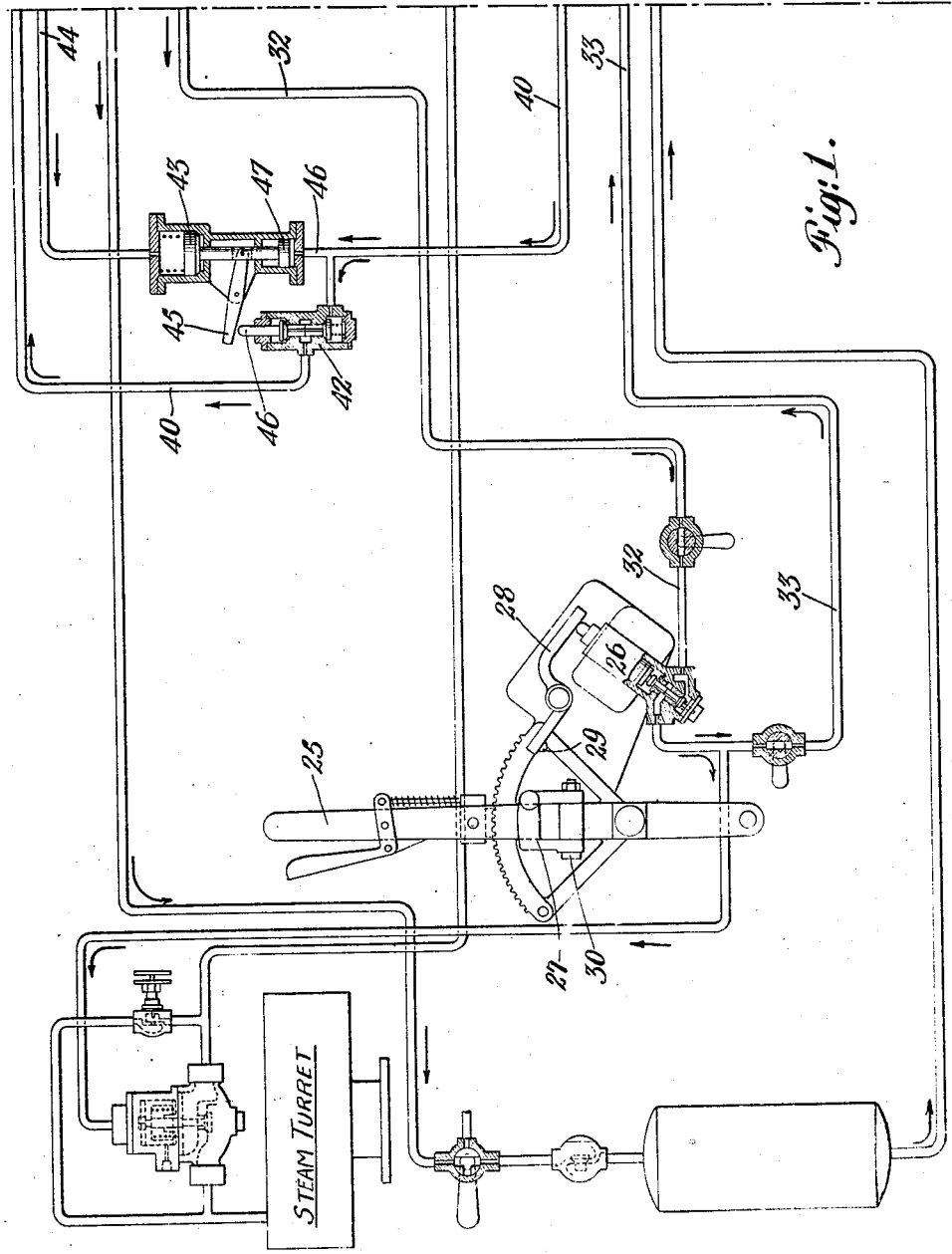

April 10, 1928.

F. R. PETERS

LOCOMOTIVE BOOSTER APPARATUS

Filed June 6, 1925

1,665,324

2 Sheets-Sheet 1

INVENTOR
Frank R. Peters
BY
Synnestvedt Lechner
ATTORNEYS

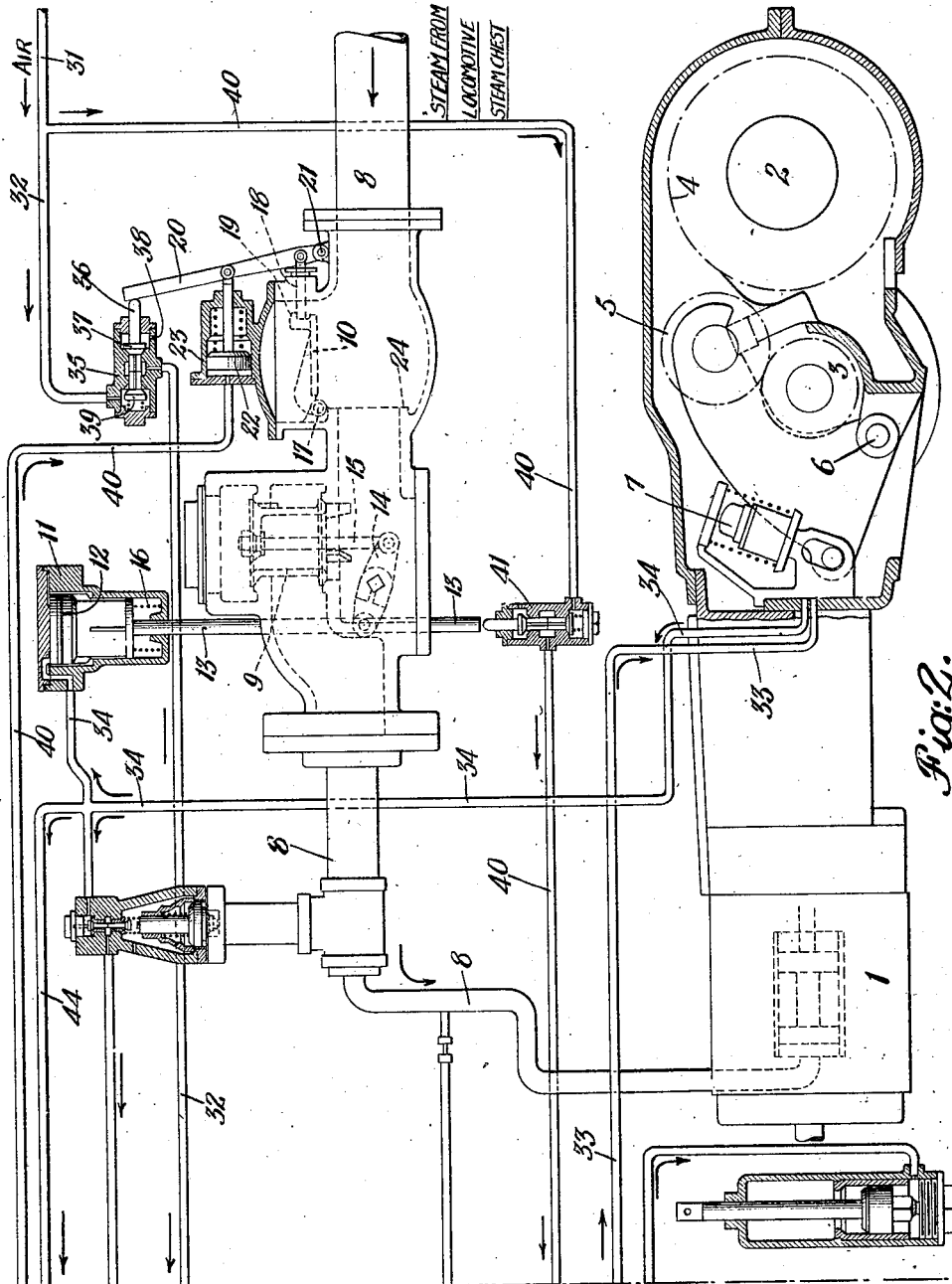

Patented Apr. 10, 1928.

1,665,324

UNITED STATES PATENT OFFICE.

FRANK RICHARD PETERS, OF NEW YORK, N. Y., ASSIGNOR TO FRANKLIN RAILWAY SUPPLY COMPANY, A CORPORATION OF DELAWARE.

LOCOMOTIVE BOOSTER APPARATUS.

Application filed June 6, 1925. Serial No. 35,398.

This invention relates to locomotive booster apparatus and particularly to certain improvements therein for the prevention of damage to moving parts in the event of failure in the controlling system.

As is now well understood in this art locomotive booster motors are intended to be operated for only a small proportion of the time and are, therefore, arranged to be entrained and disentrained from the axles which they drive. Gears are now commonly used to perform this entraining operation which gears must be brought into mesh with the least possible clashing in order to avoid damage thereto. Booster apparatus has been designed to accomplish this purpose but there are times when a failure in some part of the controlling system for the booster motor would cause severe clashing and damage to the gears were an attempt made to use the booster before rectifying the trouble.

My invention, therefore, has particular reference to an apparatus for preventing damage to the gears in the event of failure in the controlling system such as would exist should the customary booster throttle remain in its open position after the booster is cut out or disentrained. I have for my specific object the provision of means for shutting off the steam supply to the booster motor should the booster throttle stick in its open position subsequent to a disentrainment operation. I also provide means for completely disabling the booster system under such circumstances.

The foregoing together with such other objects as may appear hereinafter or are incident to my invention I obtain by means of a construction which is illustrated in preferred form in the accompanying drawings, wherein—

Figs. 1 and 2 represent together a diagrammatic showing when arranged end to end with Fig. 1 on the left.

The booster motor 1 and the axle 2 which it drives are arranged with respect to each other in the customary manner now well understood in this art which involves the use of the driving pinion 3, the driven gear 4, fixed on the axle 2 and the shiftable idler gear 5 mounted to swing on the pivot 6 under the influence of the entraining motor 7. The axle 2 may be an axle either on the tender or on the locomotive as desired and the entraining motor 7 is preferably fluid pressure operated as is the common practice at present in this art.

Operating steam is supplied to the booster motor from the locomotive steam chest thru the pipe 8 and in this pipe 8 is located the booster throttle 9 and a supplementary shut-off valve 10. The throttle 9 is opened by means of the fluid pressure motor 11, the piston 12 of which is connected to the booster throttle by means of the piston rod 13, rocking member 14 and stem 15. When fluid pressure forces the piston 12 downwardly the stem 15 is pushed upwardly to open the booster throttle 9. A spring 16 is designed to return the piston 12.

The shut-off valve 10 is pivoted at its upper side at the point 17 and is normally held upwardly in open position by means of the pin 18 which takes under the dog 19. An arm 20, pivoted at its lower end 21, is connected to the pin 18 and also to the piston 22 of a fluid pressure motor device 23 normally spring held in retracted position as shown in Fig. 2. When pressure is admitted to the face of the piston 22 the arm or lever 20 is moved outwardly and with it the pin 18 which releases the shut-off valve 10 so that it can drop down against its seat 24 and thus block the flow of steam through the pipe 8.

Fluid pressure controlling systems for booster motors are now common practice in the art and I have adopted the main features of such systems to which I have added my improvements.

Boosters are utilized only at comparatively slow speeds of the locomotive or when the locomotive cut-off is at or near its longest. In other words it is the intention to use the booster only when the reverse lever 25 is in the forward corner or somewhere near such corner for just as soon as the speed of the locomotive gets up to a point where it is necessary to materially shorten the cut-off of the locomotive it is time to disentrain the booster.

I therefore provide the usual reverse lever pilot valve 26 which is adapted to be opened by means of the latch 27 and the pivoted member 28 whenever the reverse lever 25 is at or near the corner. The latch 27 is itself pivoted for swinging movement upwardly and downwardly on the reverse lever 25 and is adapted to engage the rounded lug 29 on one end of the pivoted lever 28. The latch 27 is shown in its upward position in Fig. 1 in which it is apparent that it will engage the lug 29 upon movement of the reverse lever 25 toward the corner. By dropping or throwing the latch downwardly on its pivot pin 30 it is possible to prevent booster operation altogether or to disentrain and discontinue the use of the booster after it has once been placed in operation.

The fluid pressure system for controlling the booster apparatus is supplied with pressure, preferably air, from a source connected to the pipe 31.

In operating the piston 12 of the booster throttle operating motor the air pressure flows through the pipe 32 to the reverse lever pilot valve 26 and, if this valve is opened as before indicated, the air passes onwardly through the pipe 33 to the entraining motor 7 previously referred to. Entrainment of the gear 5 with the gear 4 then takes place after which communication is automatically established between the pipe 33 just mentioned and the pipe 34 leading from the entraining motor 7 to the face of the piston 12 which is, as before described, forced downwardly in order to open the booster throttle 9. If steam is then present in the steam chest of the locomotive, operating pressure will be delivered to the booster motor through the pipe 8.

In the pipe 32 and in advance of the reverse lever pilot valve 26 is an additional pilot valve 35 which is normally held in its open position as shown in Fig. 2 by virtue of the fact that the arm 20 engages the stem 36 to seat the valve 37 and cut off exhaust through the port 38 and unseat the valve 39 so as to establish communication between the two sections of the pipe 32 as indicated clearly in Fig. 2.

In other words the pressure for the fluid actuated controlling system for the booster motor is subject to the control of the two pilot valves, namely the reverse lever pilot valve 26 and the pilot valve 35 associated with the operating motor for the cut-off valve 10.

When it is desired to discontinue use of the booster and to disentrain it either the latch 27 is pulled outwardly from under the lug 29 or the reverse lever 25 is withddrawn sufficiently far from the corner in order to release the pivoted member 28 and consequently the valvular device in the reverse lever pilot valve 26. Under normal operation this would immediately cut off the supply of air pressure to the entraining motor 7 as well as to the booster throttle operating cylinder 11 and they would be returned to their normal position in any desired manner as by springs such as indicated in the drawings.

Upon occasions, however, the booster throttle 9 may stick in its open position thus permitting operating steam to reach the booster even though disentrainment has taken place. The load being thus removed the booster will race and if it were subsequently attempted to again throw the booster in as it is colloquially expressed or to entrain the booster very serious damage might result to the highly revolving gears. In order to prevent this I provide the following mechanism. Air pressure from the source or supply 31 may be conducted through the pipe 40 to the face of the piston 23 already described, thereby moving arm 20 outwardly and releasing the valve 10 by withdrawing the pin 18. The flow of air in the pipe 40 is under the control of two valves 41 and 42 the valve 41 being normally closed when the throttle valve 9 is closed but being adapted to be opened by the extended rod 13 when the throttle valve 9 is opened. In other words whenever the throttle is open and the booster is in operation the valve 41 is opened so that air can flow through the pipe 40 and this condition prevails should the throttle valve stick in its open position after it is desired to disentrain the booster motor and discontinue its use.

Since, under normal functioning of the apparatus, it is not desired to close the shut-off valve 10 a disabling valve 42, already mentioned, is introduced in the pipe 40 which is normally held in its closed position by the fluid pressure in the booster controlling system. This pressure is delivered to the face of a piston 43 through a pipe 44 connected to the pipe 34. When the fluid pressure controlling system is in operation the piston 43 is of course held in its downward position and the pivoted arm 45 associated with the piston 43 is held away from the stem 46 of the valve 42.

When the reverse lever pilot valve 26 is operated to cut off the flow of air through the pipe 33 there will of course be no more pressure in the pipe 34 nor in the pipe 44 so that pressure from the pipe 40 through the branch pipe 46 can reach the smaller end 47 of the piston 43 thereby forcing this piston upwardly and moving the pivoted member 45 downwardly against the stem 46 in order to open the valve 42 and permit air pressure to flow onward through the pipe 40 to the piston 22.

When the shut-off valve 10 is closed and the valve 39 is closed it is obvious that the booster can not be thrown into operation or entrained until after the trouble has been fixed and the throttle valve has again been permitted to seat.

Parts illustrated but not specifically described, while they form a part of the booster apparatus, are not specifically associated with my invention and are therefore not described.

A summary of the operation is as follows: Assuming that the locomotive is standing still and that it is desired to start up with the aid of the booster motor the first operation will be to throw the reverse lever 25 into the forward corner at the same time raising the latch 27 to the position indicated in Fig. 1. This will open the reverse lever pilot valve 26 or in other words establish communication for the fluid pressure between pipe 32 and pipe 33, the flow taking place in the direction indicated by the arrows. (In this connection it is pointed out that arrows have been introduced at various points on the drawings in order to aid in a reading thereof). This air reaches the entraining motor 7 and entrains the booster and subsequently operates the piston 12 to open the booster throttle 9 and at the same time holds the piston 43 downwardly so as not to interfere with the stem of the valve 42. No air pressure can then flow through the pipe 40.

When the booster is to be disentrained either the reverse lever 25 is hooked up or the latch 27 is pulled downwardly and away from the lug 29. The reverse lever pilot valve 26 then closes off communication between pipes 32 and 33 and the entraining motor 7 is permitted to disentrain the booster and under normal operation or functioning of the device piston 12 would be retracted and the booster throttle 9 would close. But if the booster throttle should stick in its open position air would flow through the pipe 40 past the valve 41, against the smaller face 47 of the piston 43 and then onwardly through the pipe 40, as the valve 42 is opened, to the face of the piston 22 which latter would be moved outwardly to drop the cut-off valve and close the valve 39 so that all fluid pressure to the booster controlling system would be cut off.

I claim:—

1. The combination of a normally inoperative, locomotive booster motor; a controlling system for causing and stopping operation of said motor; and a supplementary means under the control of said system which automatically prevents attempted operation by said system in the event of disorder therein.

2. The combination of a locomotive booster motor, a booster throttle valve, a supplemental, normally open, shut-off valve, means for causing closure of said shut-off valve should the throttle valve stick in open position, and means normally disabling said last means as long as the throttle valve is properly functioning.

3. The combination of a normally disentrained locomotive booster motor, means for entraining and disentraining said motor, a booster throttle valve, and means under the control of said throttle valve for preventing entrainment should the throttle remain in its open position subsequent to a previous disentrainment operation.

4. The combination of a normally disentrained locomotive booster motor, means for entraining and disentraining said motor, a booster throttle, a fluid pressure actuated controlling system for automatically entraining the motor and opening the throttle, and means subject to the throttle for preventing entrainment should the throttle remain in its open position subsequent to a previous disentrainment operation.

5. The combination of a locomotive, a steam actuated booster motor therefor, a booster throttle valve, means for opening the booster throttle when the locomotive is being operated, a normally open shut-off valve for supplementing the booster throttle, and means for causing closure of said valve should the booster throttle remain in its open position when the booster is cut out.

6. The combination of a normally disentrained locomotive booster motor, means for entraining and disentraining said motor, a booster throttle, means for causing entrainment or disentrainment and opening or closing of the throttle, a normally open shut-off valve for supplementing the booster throttle, and means for causing closure of said valve should the booster throttle remain in its open position subsequent to a previous disentrainment operation.

7. The combination of a locomotive booster motor, a throttle valve therefor, a normally open shut-off valve for supplementing the throttle valve, means for opening and closing the throttle valve, means for closing the shut-off valve, and means for causing a closure of the shut-off valve should the throttle valve remain in its open position after it is desired to stop operation of the booster.

8. The combination of a locomotive booster motor, a throttle valve therefor, a normally open shut-off valve for supplementing the throttle valve, a fluid actuated motor device for opening the throttle valve, a conduit for supplying said motor device with fluid pressure, a second fluid actuated motor device for causing closure of said shut-off valve, a conduit for supplying said second motor device with fluid pressure, a normally open valve in said first supply conduit which, however, is adapted to be closed upon actuation of the motor device for said shut-off valve, and a valve in said second supply conduit which is adapted to be opened upon actuation of the motor device for said throttle valve and to be held open should the throttle valve stick in its open position.

9. A fluid pressure actuated controlling system for a steam actuated locomotive booster motor comprising in combination with the locomotive reverse lever; a booster throttle valve; a supplementary, normally open, shut-off valve; a source of fluid pressure; a reverse lever pilot valve for the fluid pressure for the system; a fluid motor for opening the throttle valve; a fluid motor for causing closure of the shut-off valve; a second pilot valve for the fluid pressure for the system normally held in open position by the fluid motor for the shut-off valve but closed when the shut-off valve is closed; a valve for controlling the fluid pressure to the shut-off valve motor which is closed when the throttle is closed but open when the throttle is open; and a second valve for controlling the fluid pressure to the shut-off valve motor which is closed when the reverse lever pilot valve is open but which is opened when the reverse lever pilot valve is closed and the booster throttle sticks in its open position whereby fluid pressure reaches and actuates the shut-off valve motor to cause closure of said shut-off valve and of the fluid pressure pilot valve which it controls.

In testimony whereof, I have hereunto signed my name.

FRANK R. PETERS.